July 19, 1960 K. RITTER ET AL 2,945,382
DRIVE ARRANGEMENT FOR VEHICLES SUCH AS TRACTORS AND THE LIKE
Filed Feb. 3, 1958 5 Sheets-Sheet 4

INVENTORS
Kaspar Ritter and
Wolfgang Ritter
BY Michael S. Striker
ATTORNEY

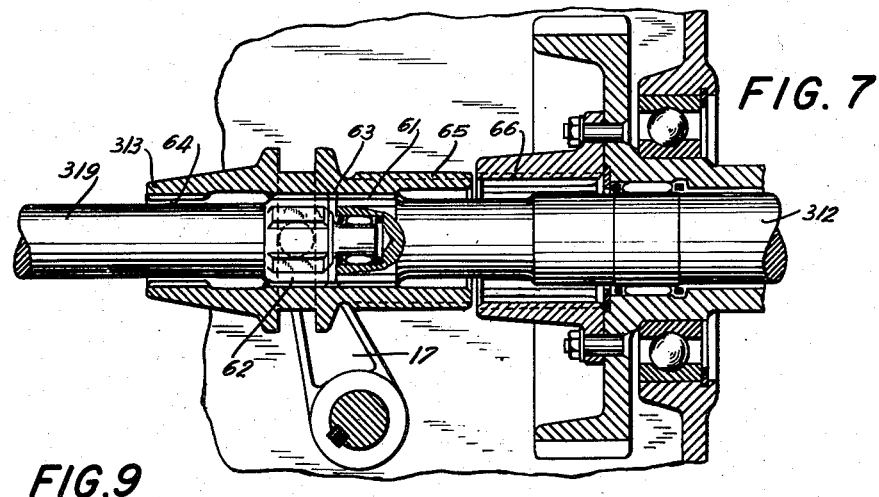
FIG. 7
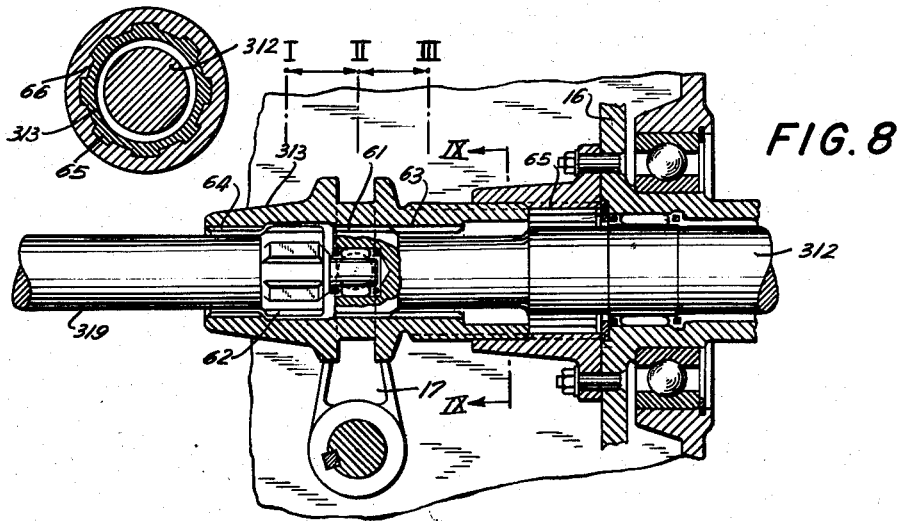
FIG. 9
FIG. 8
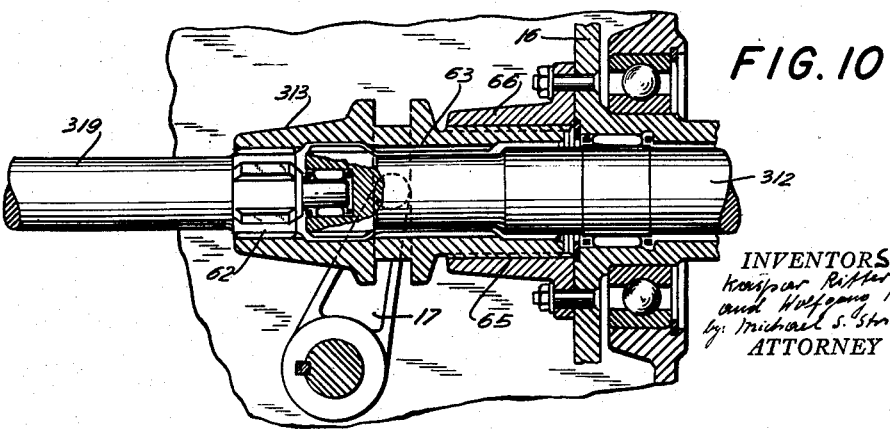
FIG. 10

United States Patent Office 2,945,382
Patented July 19, 1960

2,945,382

DRIVE ARRANGEMENT FOR VEHICLES SUCH AS TRACTORS AND THE LIKE

Kaspar Ritter, Kirchheim (Teck), and Wolfgang Huetter, Bezgenrieth, Wurttemberg, Germany, assignors to Allgaier-Werke G.m.b.H., Uhingen-Wurttemberg, Germany Filed Feb. 3, 1958, Ser. No. 712,855

Claims priority, application Germany Feb. 4, 1957

13 Claims. (Cl. 74—15.8)

The present invention relates to vehicles such as tractors and the like.

The drives of such vehicles are required to serve many purposes. In addition to driving the vehicle such as the tractor, the drive is required to drive the wheels of a trailer, for example, or such accessories as reapers, mowers, and the like. Because of these factors, conventional drives of this type are extremely complex, are not easily operable, and are made up of a large number of parts requiring a considerable amount of valuable space. Furthermore, conventional drives of this type are not fully reliable. For example, if a torque converter of such a conventional drive fails to operate, then all the operations of the tractor or the like including the turning of its own drive wheels cannot continue.

One of the objects of the present invention is to provide a drive of the above type which is composed of simple, rugged elements which will operate reliably and which take up a relatively small space, as compared to conventional drives.

Another object of the present invention is to provide a drive of the above type with a power take-off shaft which can optionally be driven at a speed proportional to the speed of movement of the vehicle or proportional to the speed of the engine which drives the vehicle.

A further object of the present invention is to provide a drive of the above type which is capable of by-passing a torque converter of the drive when the torque converter fails and which is capable of driving both the vehicle and a power take-off shaft from the engine through mechanical transmissions without using the torque converter when the latter fails.

It is also an object of the present invention to provide a drive of the above type which is capable of driving a plurality of devices simultaneously in addition to the vehicle such as a tractor or the like.

The objects of the present invention also include the provision of an automatic control which guarantees that no power is transmitted through the torque converter and that the latter is out of operation when the drive is set to by-pass the torque converter.

It is also an object of the present invention to provide an exceedingly simple arrangement for directing to a torque converter fluid which replaces fluid which leaks from the torque converter.

With the above objects in view the present invention includes in a drive for a vehicle such as a tractor or the like, a torque converter means having input and output ends and a first transmission means cooperating with the input end of the torque converter means for driving the latter from an engine, as well as a second transmission means cooperating with the output end of the torque converter for transmitting the drive from the torque converter to wheels of the vehicle. In accordance with the present invention the structure includes a power take-off shaft, a third transmission means connected operatively with the first transmission means and located adjacent the power take-off shaft, and a manually operable clutch co- operating with the power take-off shaft, the third transmission means, and the second transmission means for optionally placing the power take-off shaft in driving connection with the third transmission means to drive the power take-off shaft at a speed proportional to the engine speed or with the second transmission means to drive the power take-off shaft at a speed proportional to the speed of the vehicle.

The novel features which are considered as characteristic for the invention are set forth in particular in the appended claims. The invention itself, however, both as to its construction and its method of operation, together with additional objects and advantage thereof, will be best understood from the following description of specific embodiments when read in connection with the accompanying drawings, in which:

Fig. 7 shows on an enlarged scale the structure in the circle A of Fig. 6;

Fig. 8 shows the structure of Fig. 7 in a position different from that of Fig. 7;

Fig. 9 is a transverse sectional view taken along the line IX—IX of Fig. 8;

Fig. 10 shows the structure of Figs. 7 and 8 in a third position; and

Figure 1:
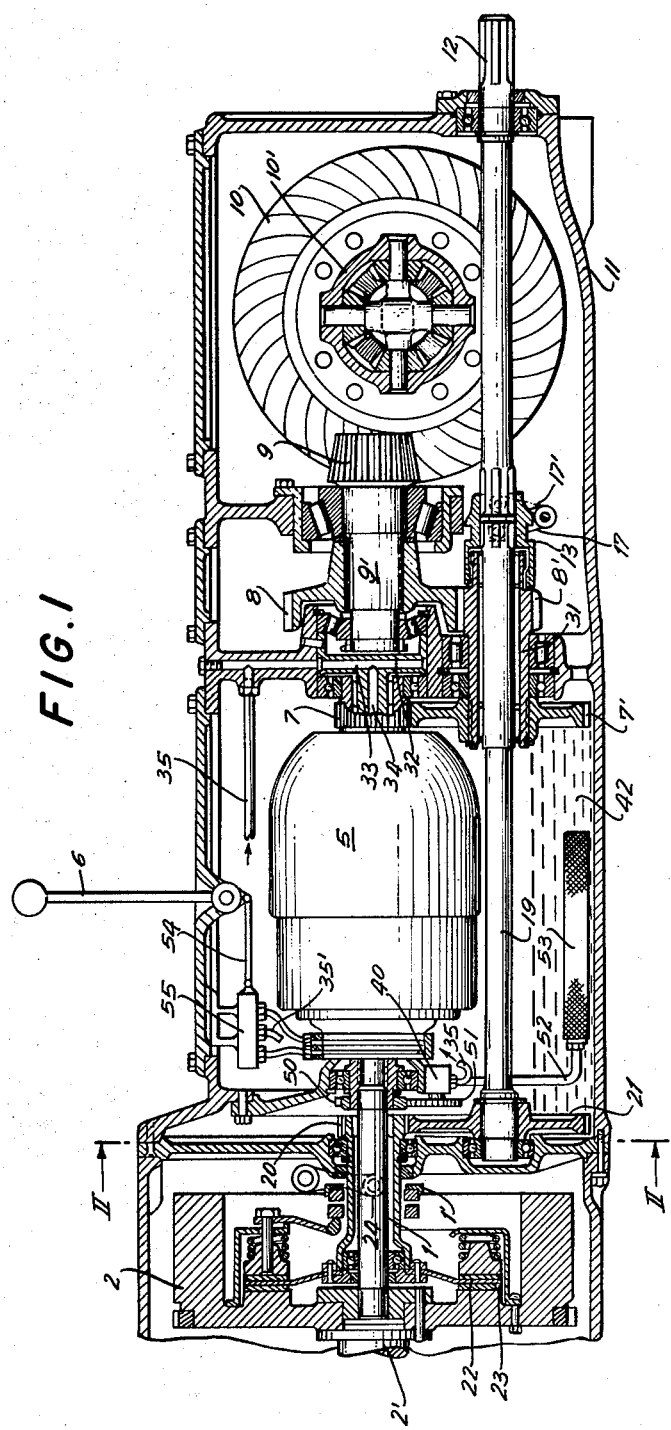
Fig. 1 is a longitudinal sectional elevational view of a drive according to the present invention.

Fig. 1 illustrates a tractor drive according to the present invention. Only the output end 2' of the crank shaft of the engine is shown at the left of Fig. 1, and this output end 2' of the crank shaft is connected directly with the flywheel 2. A coaxial extension 1 of the crank shaft is connected with the flywheel to rotate therewith, and this extension 1 is in driving engagement with the input end of a hydrostatic torque converter 5 whose output end is connected through a transmission means described below with the drive wheels of the vehicle. Thus, the flywheel 2 and the crank shaft extension 1 form a transmission means for transmitting the drive from the engine to the input end of the torque converter 5.

The transmission means between the output end of the torque converter 5 and the drive wheels of the vehicle includes a gear 7 driven directly by the torque converter and meshing with a larger gear 7', these gears 7 and 7' forming a first gear reduction unit of the transmission between the output end of the torque converter and the drive wheels of the vehicle. A second gear reduction unit of this transmission includes the gear 8' which is coaxial with the gear 7' and smaller than the same and the gear 8 which meshes with the gear 8', which is larger than the latter, and which is coaxial with the torque converter 5. A hollow shaft 31 coaxial with the gears 7' and 8' interconnects these gears as by being fixed to the hub of the gear 7' and formed integrally with the gear 8' so that the hollow shaft 31 serves to transmit the drive from the first to the second gear reduction unit of the transmission between the output end of the torque converter means 5 and the drive wheels of the vehicle. This second gear reduction unit cooperates with a bevel gear unit of the transmission, and this bevel gear unit includes the shaft 9' fixed coaxially with the gear 8 to be driven thereby, the bevel gear 9 fixed with the shaft 9' to rotate therewith, and the bevel gear 10 which meshes with the bevel gear 9' is connected operatively with the differential 10' arranged between the axles of a pair of coaxial drive wheels of the vehicle in a well known manner. The torque converter means 5 is controlled manually by operation of the lever 6 so as to be set at the option of the operator between a neutral position where no drive is transmitted through the torque converter and one or more drive positions where the operator can control the torque converter to provide in a stepless fashion any speed within a given range.

The torque converter means 5 may be of the type which includes a mechanical connection between the primary and secondary parts of the torque converter, as shown, for example, in the German Patent No. 862,538 of Dr. Ebert and the corresponding U.S. Patent No. 2,687,049. Such a torque converter provides a particularly high efficiency through a wide range of transmission ratios and at the same time is of relatively small size.

The transmissions and torque converter means are located within the housing 11 the rear wall of which, shown at the right of Fig. 1, turnably supports a power take-off shaft 12 whose axis is parallel to the axis of the torque converter 5.

A third transmission means extends from the transmission means formed by flywheel 2 and crank shaft extension 1 and terminates adjacent the power take-off shaft 12 which is coaxial with the hollow shaft 31. This third transmission means includes an elongated transmission shaft 19 which is coaxial with the shaft 12 and which is turnably supported within the hollow shaft 31 in the embodiment of Fig. 1. The transmission shaft 19 is fixed with a gear 20 which is fixed with an elongated hollow shaft 1' as by being formed integrally therewith, and the shaft 1 is freely turnable within the hollow shaft 1'. A conventional clutch 22, 23 cooperates with the flywheel 2 and the hollow shaft 1' for transmitting the drive from the transmission means 1, 2 to the third transmission means extending from the transmission means 1, 2 to the power take-off shaft, and a manually operable means 24 of conventional construction cooperates in a known way with the clutch 22, 23 for moving the latter from the engaged position shown in Fig. 1 to a disengaged position where the drive from the flywheel 2 to the hollow shaft 1' is interrupted. A manually operable clutch means is provided for connecting the power take-off shaft 12 either with the transmission shaft 19 or with the hollow shaft 31 to be driven through the latter by the transmission means connected with the output end of the torque converter 5. This clutch means takes the form of an axially shiftable sleeve 13 coaxial with the shafts 12 and 19 and surrounding the adjacent ends thereof. These adjacent ends of the shafts 12 and 19 are formed with axially extending splines, and in the position of the clutch 13 shown in Fig. 1, splines formed in the interior of the clutch 13 cooperate with both of the splined ends of the shafts 12 and 19 for placing these shafts in driving engagement with each other so that in the position of the parts shown in Fig. 1 the power take-off shaft 2 is driven from the engine through the first transmission means 2, 1 and the second transmission means 23, 22, 1', 20, 21, 19. Therefore, with the position of the parts shown in Fig. 1 the power take-off shaft 12 will be driven at a speed proportional to the engine speed and independent of the speed of movement of the vehicle. For example, if the lever 6 is set to place the torque converter means 5 in its neutral position where the vehicle is stationary, the shaft 12 can nevertheless be driven at a speed proportional to the engine speed with the position of the parts shown in Fig. 1. A manually turnable bifurcated lever 17 is connected operatively with the clutch sleeve 13 for axially shifting the latter, and when the lever 17 is turned in a clockwise direction, as viewed in Fig. 1, to the position 17', the clutch sleeve 13 is shifted to the right, as viewed in Fig. 1, so that its inner splines which previously were in engagement with the splines of the shaft 19 now engage only the splines of the shaft 12. It will be noted from Fig. 1 that the sleeve 13 has an enlarged left portion provided in its interior with splines which are out of engagement with splines located at the right end of the hollow shaft 31 when the clutch sleeve 13 is in the position shown in Fig. 1. When the lever 17 is in the position 17' of Fig. 1 the left splines of the sleeve 13 cooperate with the splines on the right end of the hollow shaft 31 to place the shaft 12 in driving engagement with the transmission which is driven by the output end of the torque converter means 5, so that with the clutch means 13, 17 in this latter position the speed of rotation of the shaft 12 will be proportional to the speed of movement of the vehicle. A drive may be taken from the shaft 12 to drive the wheels of a trailer connected to the tractor, and in this case it is desirable to rotate the shaft 12 at a speed proportional to the speed of movement of the tractor.

The transmission between the output end of the torque converter means 5 and the wheels of the vehicle, by including the pair of gear reduction units 7, 7' and 8', 8, makes it possible to provide with this simple construction the total gear reduction required for the tractor, which provides a transmission ratio on the order of 1 to 25, in an extremely small space within the housing 11, so that further gear reduction units are completely unnecessary.

The arrangement of the hollow shaft 31 between the pair of gear reduction units of the transmission driven by the torque converter means 5 makes it possible for the gear 7' to be used not only for driving the wheels of the vehicle, but also for driving the power take-off shaft 12 at a speed proportional to the vehicle speed.

A further advantage of the pair of gear reduction units driven by the torque converter means 5 is that the coaxial shaft 9' is spaced from the torque converter to provide within the housing 11 a space in which a stationary conduit means is located for supplying to the torque converter fluid which replaces fluid lost by leakage. Thus, as may be seen in Fig. 1, the member 32 is located between the output end of the torque converter means 5 and the shaft 9', and this member 32 is formed with an axial bore 34 communicating with the interior of the torque converter means 5 and with a plurality of radial bores 33 radiating from and communicating with the axial bore 34. A conduit 35 communicates with the radial bores 33, and this conduit 35 receives fluid under pressure from a pump 40. This pump 40, which may be of the rotary piston or gear type, is driven during operation of the engine by the gears 50 and 51 which mesh with each other and which are respectively connected with the shaft 1 and the pump 40, and the pump 40 sucks oil through the suction conduit 52 and a filter 53 from the oil sump 42 of the housing 11. The conduit 35 leads from the pressure discharge of the pump 40 to the conduit means 32—34 in the manner described above. A branch 35' of the conduit 35 leads to a slide valve 55 controlled by a connecting rod 54 which is connected with the lever 6 so that the turning of the lever 6 places the slide valve 55 in different positions. By turning the lever 6 the slide valve 55 is placed in different positions which control the setting of the swash plates of the torque converter so as to regulate the transmission ratio provided by the torque converter.

Figure 2:
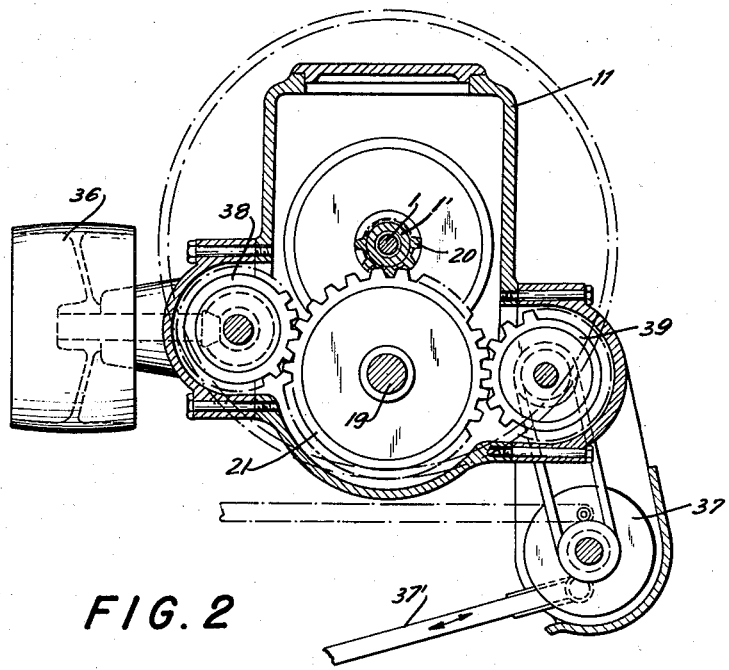
Fig. 2 is a transverse sectional view taken along the line II—II of Fig. 1 in the direction of the arrow.

As is shown in Fig. 2, the housing 11 is designed to accommodate on the one hand a gear 38 which meshes with the gear 21 and which drives a pulley 36 at the exterior of the housing 11 through a suitable bevel gear transmission, and on the other hand a gear 39 which also meshes with the gear 21 and which through a suitable belt drive rotates a crank plate 37, the rotation of which reciprocates a rod 37' for operating a device such as a mower or reaper. Thus, the clutch 22, 23 may be operated through manually operable lever 24 for connecting not only the transmission means which includes the shaft 19 with the flywheel but also the gears 38 and 39 for driving a pair of accessories directly from the engine independently of the speed of movement of the vehicle, and of course the clutch 22, 23 makes it possible to connect the accessory devices when they are under load with the rotating flywheel 2.

Figure 3:
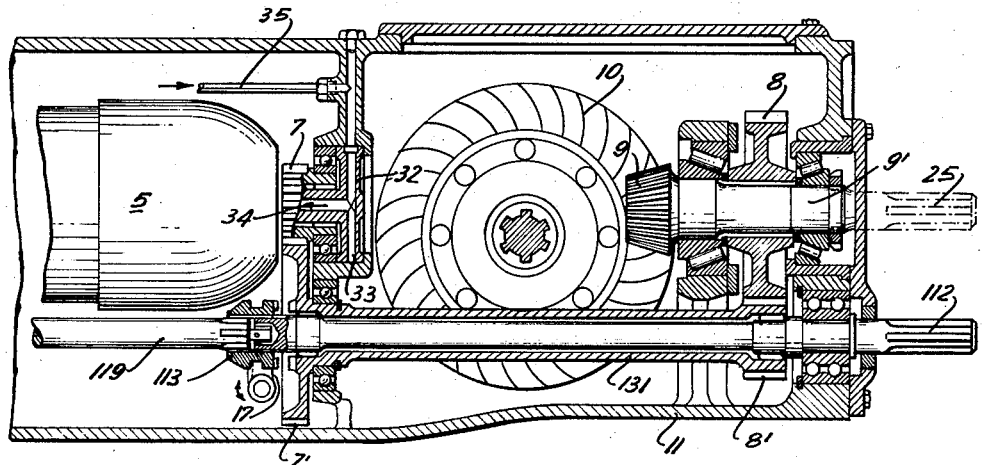
Fig. 3 is a fragmentary longitudinal sectional elevational view showing another embodiment of the drive of Fig. 1.

The structure shown in Fig. 3 differs from that of Fig. 1 in that the bevel gear unit 9 and 10 is arranged between the gear reduction unit 7, 7' and the gear reduction unit 8', 8. The elonated hollow shaft 131, which corresponds to the shaft 31, is considerably longer than the shaft 31 and serves in the same way to interconnect the gears 7' and 8'. In the embodiment of Fig. 3 the power take-off shaft 112 extends through the shaft 131 and has its left end located adjacent the right end of the elongated transmission shaft 119 which corresponds to the shaft 19 of Fig. 1. The clutch sleeve 113 is shiftable upon manual turning of the lever 17 from the position shown in Fig. 3 where the splines in the interior of the clutch sleeve 113 mesh with splines on the adjacent ends of the shafts 112 and 119 to the right, as viewed in Fig. 3, to a position where clutch dogs on the right end face of the sleeve 113 mesh with mating dogs on the left face of the gear 7', the sleeve 113 at this time being completely out of engagement with the shaft 119 to connect the power take-off shaft 112 with the gear 7'. The construction of Fig. 3 enables the rear wheels driven from the gear 10 to be located nearer to the front wheels so that the vehicle length can be shortened, and in addition it is possible in an extremely simple manner with the use of only a small amount of material to provide a second take-off shaft 25 connected directly with the shaft 9'.

With the construction of Figs. 1 and 3, because the shaft 9' is coaxial with the torque converter 5 the housing 11 need only be provided with a pair of main longitudinal passages respectively located at the elevations of the axis of the torque converter and the axis of the power take-off shaft 12 and a single main transverse passage for the axles driven by the differential 10', so that the construction of the housing 11 is extremely simple.

Figure 4:
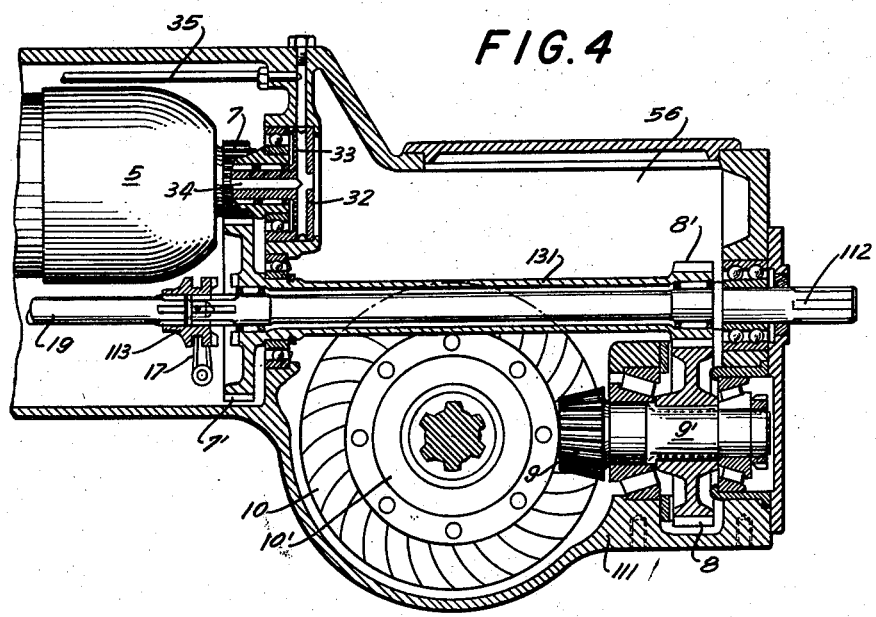
Fig. 4 is a fragmentary longitudinal sectional elevational view of a further embodiment of the drive of the present invention.

In the embodiment shown in Fig. 4 the parts are the same as in Fig. 3, and the housing 111 is shaped differently from the housing 11 of Fig. 3 while the parts are positioned differently. Thus, as may be seen from Fig. 4, the gear 8 together with the bevel gear unit 9, 10 are arranged at a lower elevation than the shaft 131, and the housing 111 is shaped correspondingly. As a result, it is possible to provide a greater floor space for the main part of the tractor since the lowest part of the housing 111 receives the gear 10 and the differential 10'. Moreover, a free space 56 is available in the housing 111 over the differential 10', and this free space can be conveniently used for a hydraulic jack, for example.

Figure 5:
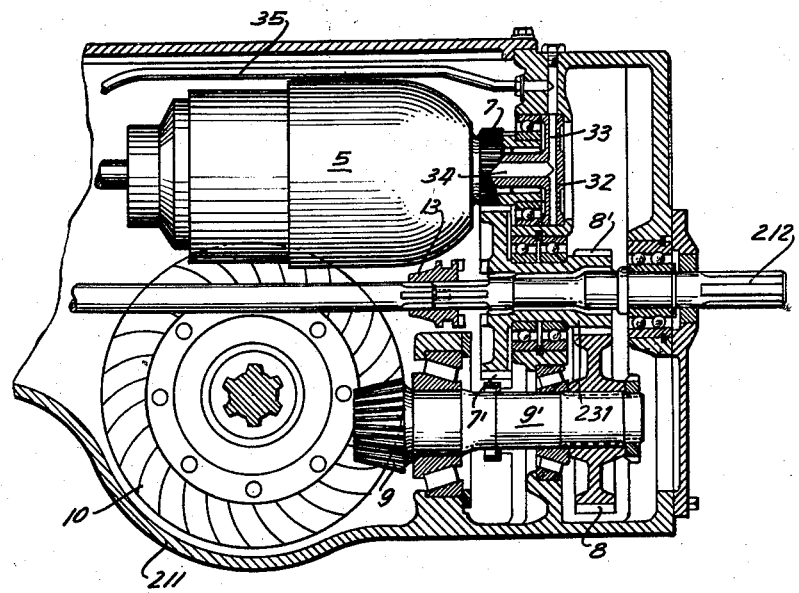
Fig. 5 is a fragmentary longitudinal sectional elevational view showing still another embodiment of a drive according to the present invention.

In the arrangement shown in Fig. 5, the entire organization has an extremely short length. The torque converter 5 is arranged directly over the differential and the bevel gear unit 9, 10, the shaft 212 corresponding to the shaft 112 of Fig. 4 but being shorter. Also, the elongated hollow shaft 231 corresponds to the shaft 131 but is shorter. Otherwise, the construction of Fig. 5 is the same as that of Fig. 4, except that the housing 211 is of course shorter than that of Fig. 4 and shaped in the manner shown in Fig. 5. It will be noted that with the arrangement of Fig. 5 not only is the entire assembly shortened considerably, but in addition there is still considerable free floor space for the vehicle.

Figure 6:
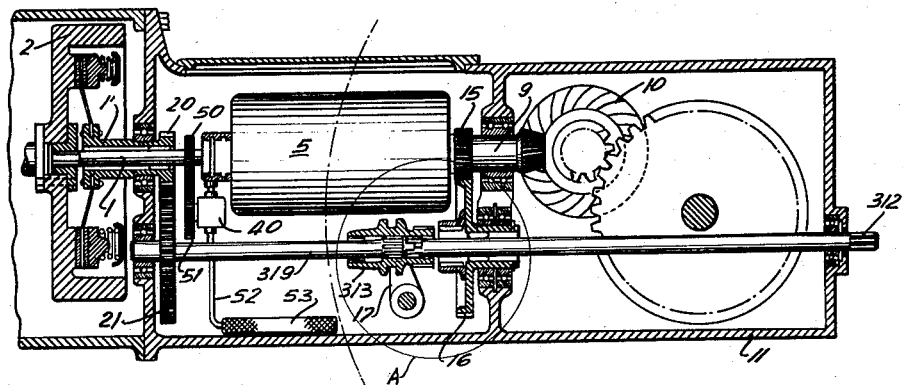
Fig. 6 is a schematic longitudinal sectional elevational view of still another possible drive arrangement in accordance with the present invention.

In the embodiment of the invention which is schematically illustrated in Fig. 6, the gears 15 and 16 replace the gears 7 and 7', respectively, and the bevel gear 9 is connected directly with the output end of the torque converter to provide together with the shaft 9' and the bevel gear 10 as well as the differential driven by the latter the transmission extending between the output end of the converter and the drive wheels. The power take-off shaft 312 corresponds to the power take-off shaft 12 of Fig. 1, while the power take-off shaft 319 cooperates with the flywheel 2 in the same way as the shaft 19 of Fig. 1. The coaxial shafts 312 and 319 have splined portions at their adjacent ends, and the clutch means 313 which is still manually operable through turning of the lever 17 provides between the power take-off shaft 312, the transmission means which includes the shaft 319, and the transmission means which includes the shaft 9' a cooperation which enables not only the shaft 312 to be optionally driven from the engine or from the torque converter but also enables the torque converter to be by-passed so that the tractor can still be operated if the torque converter should fail. The several units cooperate with each other through the structure shown in the circle A of Fig. 6, and this structure is shown on an enlarged scale in Figs. 7–10.

In the position of the clutch sleeve 313 shown in Fig. 7, the splines 63 on the interior of the clutch sleeve mesh with the splines 62 of the shaft 319 and the splines 61 of the shaft 312, so that the latter shaft is in driving engagement with the shaft 319 and is driven from the engine. The exterior splines 65 at the right end of the sleeve 313 are out of mesh with the interior splines 66 of the hub of the gear 16 so that no drive is transmitted through the gear 16 to the gear 15 and the shaft 9' in the position of the parts shown in Fig. 7, and also the interior splines 64 at the left end of the sleeve 313 of Fig. 7 are out of mesh with the splines 62 of the shaft 319. The parts as shown in Fig. 7 in position I indicated in Fig. 8.

When the sleeve 313 is shifted to the right from position I to position II, as illustrated in Fig. 8, the splines 63 of the clutch sleeve 313 move out of mesh with the splines 62 and while remaining in mesh with the splines 61 of the shaft 312 the splines 65 move into mesh with the splines 66, so that in the position of the parts shown in Fig. 8 the power take-off shaft 312 is disconnected from the transmission shaft 319 and is driven directly from the converter through the gears 15 and 16, so that when the parts have the position of Fig. 8 the power take-off shaft 312 turns at a speed which is proportional to the speed of movement of the vehicle.

The lever 17 may be manually turned through a suitable unillustrated linkage beyond the position of Fig. 8 in a clockwise direction to the position III indicated in Fig. 8, and the parts are illustrated in this latter position in Fig. 10. Fig. 9 shows the manner in which the splines 65 of the sleeve 13 cooperate with the interior splines 66 of the hub of the gear 16.

Referring now to Fig. 10, it will be seen that the splines 64 at the left end of the sleeve 313 have moved into mesh with the splines 62 at the right end of the shaft 319, the exterior splines 65 still remaining in mesh with the interior splines 66 of the hub of the gear 16, while the splines 63 of the clutch sleeve 13 no longer mesh with the splines 61 of the shaft 312. Therefore, in the position of the parts shown in Fig. 10 the torque converter 5 is by-passed and the drive is transmitted from the transmission 1, 2 to the transmission 22, 23, 1', 20, 21, 319, and from the shaft 319 through the clutch 313 and the gears 15 and 16 to the transmission 9', 9, 10. Therefore, the parts may be placed in the position shown in Fig. 10 for driving the tractor from the engine without the torque converter. Also, in the event that it is difficult to start the engine, the parts may be placed in the position of Fig. 10 to drive the engine from the vehicle wheels. Also, the parts may be placed in the position of Fig. 10 when using the engine as a brake while going downhill. Therefore, with the structure of Fig. 6–10 the tractor is still operable even if the torque converter fails.

Figure 11:
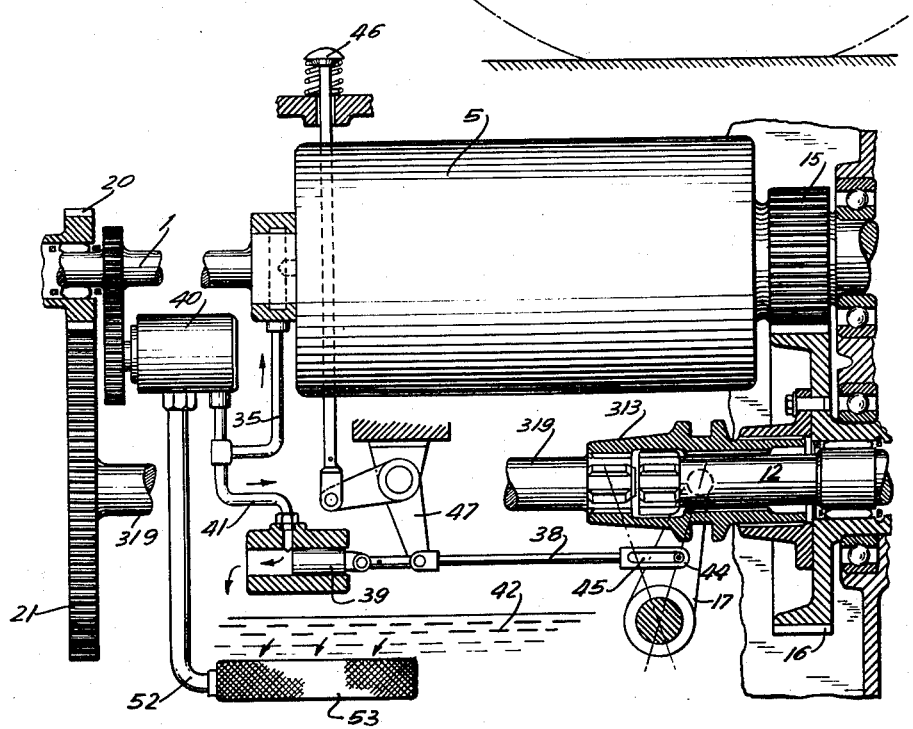
Fig. 11 is a fragmentary sectional schematic elevational view illustrating torque converter controls used with the structure of Figs. 6–10.

Fig. 11 shows the structure for automatically preventing the transmission of fluid under pressure to the torque converter when the parts have the position shown in Fig. 10. As may be seen from Fig. 11, the lever 17 is connected through a connecting rod 38 with a slide valve 39. This slide valve 39 communicates through conduit 41 with the conduit 35 for opening and closing the latter conduit. In the open position of the valve 39 which is shown in Fig. 11, the fluid pumped by the pump 40 will move out of the conduit 35 before reaching the torque converter and will instead flow along the conduit 41 and through the open valve 39 back to the sump 42. A pin 44 is fixed to the lever 17 and rides in a slot 45 of the connecting rod 38 for automatically placing the valve 39 in the open position thereof illustrated in Fig. 11 whenever the clutch sleeve 313 is shifted to the position shown in Figs. 10 and 11. Thus, any transmission of power through the torque converter at this time is reliably prevented, and if the torque converter should accidentally be operated unintentionally or through error at this time, nothing will happen and the parts will not be injured.

The cooperation of the elongated slot 45 with the pin 44 enables the valve 39 to be placed manually in its open position when the lever 17 is turned to place the clutch sleeve 313 in positions I or II of Fig. 8. This movement of the valve independently of the lever 17 is brought about by a bell crank 47 connected to the connecting rod 38 and to a manually operable push rod 46 which can be manually moved at any time to prevent transmission of fluid under pressure to the torque converter. The valve 39 may also be connected with the control lever 6 of the torque converter to be placed in its open position when the lever 6 is located in its neutral position.

It will be noted that when the sleeve 313 is located between positions II and III of Fig. 8, the splines 61 will mesh with the splines 63, so that at this intermediate position not only can the torque converter be by-passed but in addition the power take-off shaft 312 can be driven, and as may be seen from Fig. 1, when the lever 17 is arranged between its end positions illustrated in Fig. 1 the clutch sleeve 13 will interconnect on the one hand the shaft 19 with the shaft 12 and on the other hand the shaft 19 with the hollow shaft 31, so that by locating the sleeve 13 of Fig. 1 in such an intermediate position it is also possible to by-pass the torque converter 5 and drive the vehicle from the engine without using the torque converter. Of course, in this case a safety device as was described above in connection with Fig. 11 is incorporated into the construction of Fig. 1 for preventing inadvertent operation of the torque converter when the transmission is set to by-pass the latter.

It will be understood that each of the elements described above, or two or more together, may also find a useful application in other types of vehicle drives differing from the types described above.

While the invention has been illustrated and described as embodied in an adjustable vehicle transmission, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A drive for a vehicle such as a tractor or the like, comprising, in combination, torque converter means having an input end and an output end; first transmission means connected operatively with said input end of said torque converter means for transmitting a drive from an engine to said torque converter means; second transmission means connected operatively with said output end of said torque converter means for transmitting the drive from said torque converter means to wheels of the vehicle; a power take-off shaft; third transmission means by-passing said torque converter means, operatively connected with said first transmission means to be driven thereby, and terminating adjacent said power take-off shaft; and operator-actuated means cooperating with said second and third transmission means and operable at the will of the operator for optionally connecting said power tak-off shaft with said third transmission means for driving said shaft at a speed proportional to the speed of the engine and independent of the speed of the vehicle or with said second transmission means for driving said shaft at a speed proportional to the speed of the vehicle.

2. A drive for a vehicle such as a tractor or the like, comprising, in combination, torque converter means having an input end and an output end; first transmission means connected operatively with said input end of said torque converter means for transmitting a drive from an engine to said torque converter means; second transmission means connected operatively with said output end of said torque converter means for transmitting the drive from said torque converter means to wheels of the vehicle; a power take-off shaft; third transmission means by-passing said torque converter means, operatively connected with said first transmission means to be driven thereby, and terminating adjacent said power take-off shaft; and operator-actuated means cooperating with said second and third transmission means and operable at the will of the operator for optionally connecting said power take-off shaft with said third transmission means for driving said shaft at a speed proportional to the speed of the engine and independent of the speed of the vehicle or with said second transmission means for driving said shaft at a speed proportional to the speed of the vehicle; a housing in which said torque converter means, first, second and third transmission means, and part of said shaft are located; and stationary conduit means carried by said housing and located in part between said output end of said torque converter means and part of said second transmission means and communicating with said torque converter means for directing to the latter fluid which replaces fluid which leaks from said torque converter means.

3. A drive as recited in claim 1 and wherein said second transmission means includes a first gear reduction unit connected directly with said torque converter means, a second gear reduction unit and a bevel gear unit connected with said second gear reduction unit for transmitting the drive therefrom said said vehicle wheels, and an elongated hollow shaft coaxial with said power take-off shaft and operatively connected with said first and second gear reduction units of said second transmission means for transmitting the drive from said first to said second gear reduction unit, said third transmission means including a transmission shaft coaxial with said power take-off shaft, and said hollow shaft at least partly surrounding one of the other shafts, said transmission shaft being connected directly with said first transmission means to be driven thereby, and said operator-actuated means optionally placing said power take-off shaft in driving connection with said transmission shaft or said hollow shaft.

4. A drive as recited in claim 3 and wherein said second gear reduction unit includes a final output gear connected directly with said bevel gear unit, and said final output gear of said second gear reduction unit being coaxial with said torque converter means.

5. A drive as recited in claim 3 and wherein said second gear reduction unit of said second transmission means includes a final output gear connected directly with said bevel gear unit and having an axis parallel to the axis of said hollow shaft and to the axis of said torque converter means, the axis of said torque converter means being at a higher elevation than the axis of said hollow shaft, and the axis of said hollow shaft being at a higher elevation than the axis of said final output gear of said second gear reduction unit.

6. A drive as recited in claim 1 and wherein additional power take-off means are operatively connected with said second transmission means to be driven thereby for driving tractor attachments or the like.

7. A drive for a vehicle such as a tractor or the like, comprising, in combination, torque converter means having an input end and an output end; first transmission means connected operatively with said input end of said torque converter means for transmitting a drive from an engine to said torque converter means; second transmission means connected operatively with said output end of said torque converter means for transmitting the drive from said torque converter means to wheels of the vehicle; a power take-off shaft having opposed input and output ends, said input end of said power take-off shaft being located adjacent said second transmission means; third transmission means connected operatively with said first transmission means to be driven thereby and terminating adjacent said input end of said power take-off shaft; and operator-actuated clutch means cooperating with said input end of said power take-off shaft and with said second and third transmission means and having three operating positions as follows:

(1) a position interconnecting said power take-off shaft with said third transmission means for driving said power take-off shaft at a speed proportional to the speed of the engine and independent of the speed of the vehicle;

(2) a position interconnecting said power take-off shaft with said second transmission means for driving said power take-off shaft at a speed proportional to the speed of the vehicle; and (3) a position interconnecting said second and third transmission means for by-passing said torque converter means and driving the vehicle wheels from the engine through said first, third and second transmission means.

8. A drive as recited in claim 7 and wherein said operator-actuated clutch means also has a fourth position connecting said third transmission means simultaneously with said second transmission means and with said power take-off shaft for driving the latter shaft simultaneously with the driving of the vehicle wheels from the engine through said first, third and second transmission means.

9. A drive as recited in claim 7, and control means cooperating with said torque converter means and said operator-actuated clutch means for automatically preventing any transmission of power through said torque converter means when said clutch means is set by the operator to connect said third transmission means with said second transmission means.

10. A drive as recited in claim 9 and wherein said control means includes a valve communicating with a conduit which leads fluid under pressure to said torque converter means and having a closed position which maintains said conduit closed during operation of said torque converter means and an open position which opens said conduit to prevent the flow of pressure fluid therethrough to said torque converter means, said valve being connected operatively with said operator-actuated clutch means to be placed in its open position when said clutch means is placed in said position interconnecting said second and third transmission means.

11. A drive as recited in claim 10 and wherein an operator-actuated means cooperates with said valve for placing the same in said open or closed positions thereof at the will of the operator when said operator-actuated clutch means is not in its position interconnecting said second and third transmission means.

12. A drive as recited in claim 1 and wherein an operator-actuated clutch means cooperates with said first and third transmission means for optionally placing said third transmission means into or out of driving engagement with said first transmission means.

13. A drive for a vehicle such as a tractor or the like, comprising, in combination, hydrostatic torque converter means having an input end and an output end; first transmission means connected operatively with said input end of said torque converter means for transmitting a drive from an engine to said torque converter means; second transmission means connected operatively with said output end of said torque converter means for transmitting the drive from said torque converter means to wheels of the vehicle; a power take-off shaft; third transmission means by-passing said torque converter means, operatively connected with said first transmission means to be driven thereby, and terminating adjacent said power take-off shaft; and operator-actuated means cooperating with said second and third transmission means and operable at the will of the operator for optionally connecting said power take-off shaft with said third transmission means for driving said shaft at a speed proportional to the speed of the engine and independent of the speed of the vehicle or with said second transmission means for driving said shaft at a speed proportional to the speed of the vehicle.

References Cited in the file of this patent

UNITED STATES PATENTS

| | | |
|---|---|---|
| 2,349,880 | Orelind | May 30, 1944 |
| 2,680,377 | Gerst | June 8, 1954 |
| 2,723,569 | Ferguson et al | Nov. 15, 1955 |
| 2,756,600 | Kamlukin et al | July 31, 1956 |
| 2,830,670 | Ferguson | Apr. 15, 1958 |

FOREIGN PATENTS

| | | |
|---|---|---|
| 886,884 | France | Oct. 27, 1943 |